(12) United States Patent
Kim (10) Patent No.: US 7,228,753 B2
(45) Date of Patent: Jun. 12, 2007

(54) SHIFT CONTROL APPARATUS FOR A TRANSMISSION

(75) Inventor: Hong Ho Kim, Hwaseong (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 636 days.

(21) Appl. No.: 10/750,652

(22) Filed: Dec. 31, 2003

(65) Prior Publication Data

US 2005/0072259 A1 Apr. 7, 2005

(30) Foreign Application Priority Data

Oct. 1, 2003 (KR) .................. 10-2003-0068371

(51) Int. Cl.
*F16H 61/34* (2006.01)
(52) U.S. Cl. .................. 74/473.15; 74/473.1
(58) Field of Classification Search .............. 74/473.1, 74/473.15, 473.3, 473.36
See application file for complete search history.

(56) References Cited

U.S. PATENT DOCUMENTS

| | | | |
|---|---|---|---|
| 2,250,820 A * | 7/1941 | Backus ................. | 74/473.15 |
| 4,483,211 A * | 11/1984 | Hurlow ................. | 74/473.15 |
| 4,608,877 A * | 9/1986 | Okubo et al. ........... | 74/473.1 |
| 4,916,964 A * | 4/1990 | Crack ................... | 74/473.15 |
| 5,036,722 A * | 8/1991 | Park .................... | 74/473.22 |
| 5,052,239 A * | 10/1991 | Ubagai ................. | 74/473.36 |
| 5,063,810 A * | 11/1991 | Fujii ................... | 74/473.15 |
| 5,321,993 A * | 6/1994 | Herzog et al. .......... | 74/473.15 |
| 5,704,251 A * | 1/1998 | Alber et al. ........... | 74/473.25 |
| 5,845,536 A * | 12/1998 | Certeza ................ | 74/473.26 |

FOREIGN PATENT DOCUMENTS

| | | |
|---|---|---|
| CN | 1043778 A | 7/1990 |
| DE | 69106331 T | 7/1995 |
| DE | 10111911 | 9/2002 |
| JP | 2000-274526 | 10/2000 |
| KR | 1998-031250 | 7/1998 |
| KR | 10-2001-10036381 A | 5/2001 |

* cited by examiner

*Primary Examiner*—William C. Joyce
(74) *Attorney, Agent, or Firm*—Morgan Lewis & Bockius LLP (57) ABSTRACT

A shift control apparatus for a transmission wherein the gear shift lever is configured to undergo movement in a first and a second direction. A plurality of shift lugs are disposed within the transmission and configured to realize a specific speed ratio according to its longitudinal movement. The control shaft is disposed within the housing such that it can move in a longitudinal direction and rotate. The select control assembly is connected to the gear shift lever and the control shaft such that the control shaft moves in the longitudinal direction, thereof, responding to a movement of the gear shift lever in the first direction and rotates responding to a movement of the gear shift lever in the second direction.

14 Claims, 9 Drawing Sheets

SHIFT CONTROL APPARATUS FOR A TRANSMISSION

CROSS-REFERENCE TO RELATED APPLICATIONS

This application claims priority of Korean Application No. 10-2003-0068371, filed Oct. 1, 2003, the disclosure of which is incorporated fully herein by reference.

FIELD OF THE INVENTION

Generally, the present invention relates to a shift control apparatus for a transmission of a vehicle. More particularly, the shift control apparatus transmits a select operation and a shift operation of a shift lever.

BACKGROUND OF THE INVENTION

Typically, a shift control apparatus for transmitting a shift operation and a select operation of a shift lever to a transmission includes a shift control cable and a select control cable. In a conventional shift control apparatus, the shift control cable and the select control cable are connected to a control shaft, which is vertically disposed in the transmission, through a shift control lever and a select control lever. The control shaft undergoes vertical movements responding to operations of the select control cable, so that a control finger provided in the control shaft moves between a plurality of shift lugs. The control shaft undergoes rotational movement responding to operations of the shift control cable so that the control finger moves the shift lug. Furthermore, often a shoe to which a select control lever is coupled is exposed, so that it may collect impurities.

Furthermore, since the select control lever and a shift lever are configured to be dependent on each other shift feeling becomes deteriorated. Still furthermore, because the control shaft is vertically disposed, a return spring that supports the control shaft in the upward direction must be large, such that a relatively great force is needed for a select operation. Also, in the conventional shift control apparatus, a shock generated in a transmission cannot be effectively prevented from being transmitted to the gear shift lever.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention provides a shift control apparatus in which a shift control assembly and a select control assembly operate independently and in which a control shaft is horizontally disposed so that good shift feeling can be achieved.

Furthermore, embodiments of the present invention provide a shift control apparatus that includes a shift shoe and a select shoe, such that shocks generated in a transmission can effectively be prevented from being transmitted to a gear shift lever.

Still furthermore, embodiments of the present invention provide a shift control apparatus in which a control shaft is horizontally disposed and is elastically supported by elastic members, so that the shift feeling can be improved.

In a preferred embodiment of the present invention, the shift control apparatus for a transmission comprises a gear shift lever, a plurality of shift lugs, a housing, a control shaft, a select control assembly, and a shift control assembly. The gear shift lever is configured to undergo movement in a first direction and in a second direction. The plurality of shift lugs are disposed within the transmission and are configured to realize a specific speed ratio according to its longitudinal movement. The control shaft is disposed within the housing and is provided with at least one control finger at a lower portion thereof, and it is configured to be able to move in a longitudinal direction thereof such that the control finger can be positioned on the shift lugs, and it is configured to be able to rotate such that the control shaft can move the shift lugs.

The select control assembly is connected to the gear shift lever and the control shaft such that the control shaft moves in a longitudinal direction thereof responding to a movement of the gear shift lever in the first direction. The shift control assembly is connected to the gear shift lever and the control shaft such that the control shaft rotates responding to a movement of the gear shift lever in the second direction. Preferably, a first through hole is formed in the housing.

The select control assembly comprises a select control shaft, a select control lever, a select control cable, a connecting plate, a pin member, a select shoe, and a select shoe guide. The select control shaft is rotatably inserted into the first through hole, while the select control lever is fixedly connected to an upper portion of the select control shaft. The select control cable connects the gear shift lever and the select control lever together such that the select control lever and the select control shaft rotate responding to the movement of the gear shift lever in the first direction. One end of the connecting plate is fixedly connected to a lower portion of the select control shaft. An upper portion of the pin member is fixedly connected to the other end of the connecting plate at a lower portion thereof, and a lower portion of the pin member is rotatably inserted into the select shoe. The select shoe guide is fixedly coupled to the control shaft and is provided with a select shoe guide channel within which the select shoe is slidably disposed. It is preferable that the select shoe is made of plastic material, and it is further preferable that the select shoe guide channel is formed along a circumferential direction of the control shaft.

It is also preferable that the select control shaft is disposed above the control shaft and away by a predetermined distance from a longitudinal center axis of the control shaft, and that a second through hole is formed in the housing.

The shift control assembly comprises a shift control shaft, a shift control lever, a shift control cable, a connecting plate, a ball member, a shift shoe, and a shift shoe guide. The shift control shaft is rotatably inserted into the second through hole. The shift control lever is fixedly connected to an upper portion of the shift control shaft, while the shift control cable connects the gear shift lever and the shift control lever together such that the shift control lever and the shift control shaft rotate in response to the movement of the gear shift lever in the second direction. One end of the connecting plate is fixedly connected to a lower portion of the shift control shaft, an upper portion of the ball member is fixedly connected to the other end of the connecting plate at a lower portion thereof, and a lower portion of the ball member is rotatably inserted into the shift shoe. The shift shoe guide is fixedly coupled to the control shaft and is provided with a shift shoe guide channel within which the shift shoe, preferably made of plastic, is slidably disposed.

Preferably, the shift shoe guide channel is formed along a longitudinal direction of the control shaft. It is also preferable that the shift control shaft is disposed above the control shaft. Preferably, the control shaft is provided with a forward speed ratio finger and a reverse speed ratio finger, and the reverse speed ratio finger is integrated with the shift shoe guide.

It is preferable that the shift control assembly further comprises a first mass and a second mass that are respectively coupled to ends of the shift control lever. It is preferable that the shift control cable is pivotally connected to the shift control lever near a position where the first mass is coupled to the shift control lever, and wherein the shift control shaft is coupled to the shift control lever at a position between a position where the first mass is coupled to the shift control lever and a position where the second mass is coupled to the shift control lever.

It is further preferable that the second mass is configured such that a rotating center of the shift control lever is positioned at a position where the shift control shaft is coupled to the shift control lever. It is also preferable that the shift control apparatus further comprises a first elastic member and a second elastic member that elastically support the control shaft in opposite directions, and that the first and second elastic members are coil springs.

It is preferable that the plurality of shift lugs comprises at least one forward speed ratio shift lug, and that the control shaft is provided with a forward speed ratio finger for moving the forward speed ratio shift lug and a reverse speed ratio finger for moving the reverse speed ratio shift lug.

BRIEF DESCRIPTION OF THE DRAWINGS

The accompanying drawings, which are incorporated in and constitute a part of the specification, illustrate an embodiment of the invention, and, read together with the description, serve to explain the principles of the invention, where.

DETAILED DESCRIPTION OF PREFERRED EMBODIMENTS

Figure 1:
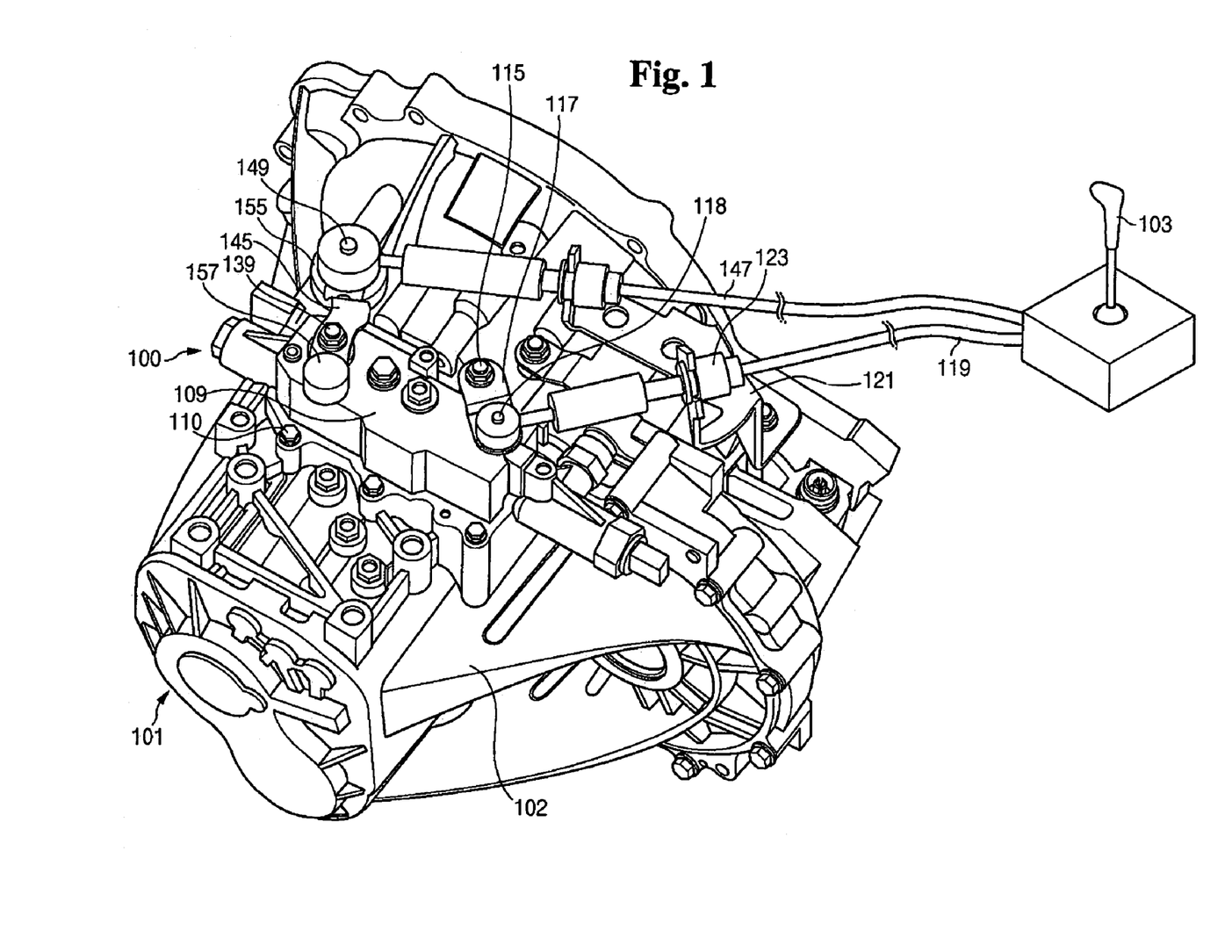
FIG. 1 shows a shift control apparatus according to an embodiment of the present invention.

As shown in FIG. 1, a shift control apparatus 100 according to the present invention is mounted to a transmission 101. The shift control apparatus 100 transmits operations of a gear shift lever 103 to the transmission 101, such that a specific gear ratio can be established according to the operation of the gear shift lever 103. The transmission 101 is a manual transmission that establishes a plurality of shift ratios according to a driver's manipulation of the gear shift lever 103. The gear shift lever 103 can be a conventional gear shift lever. The gear shift lever 103 is disposed beside a driver's seat, and it is configured to undergo movements in two directions.

Figure 2:
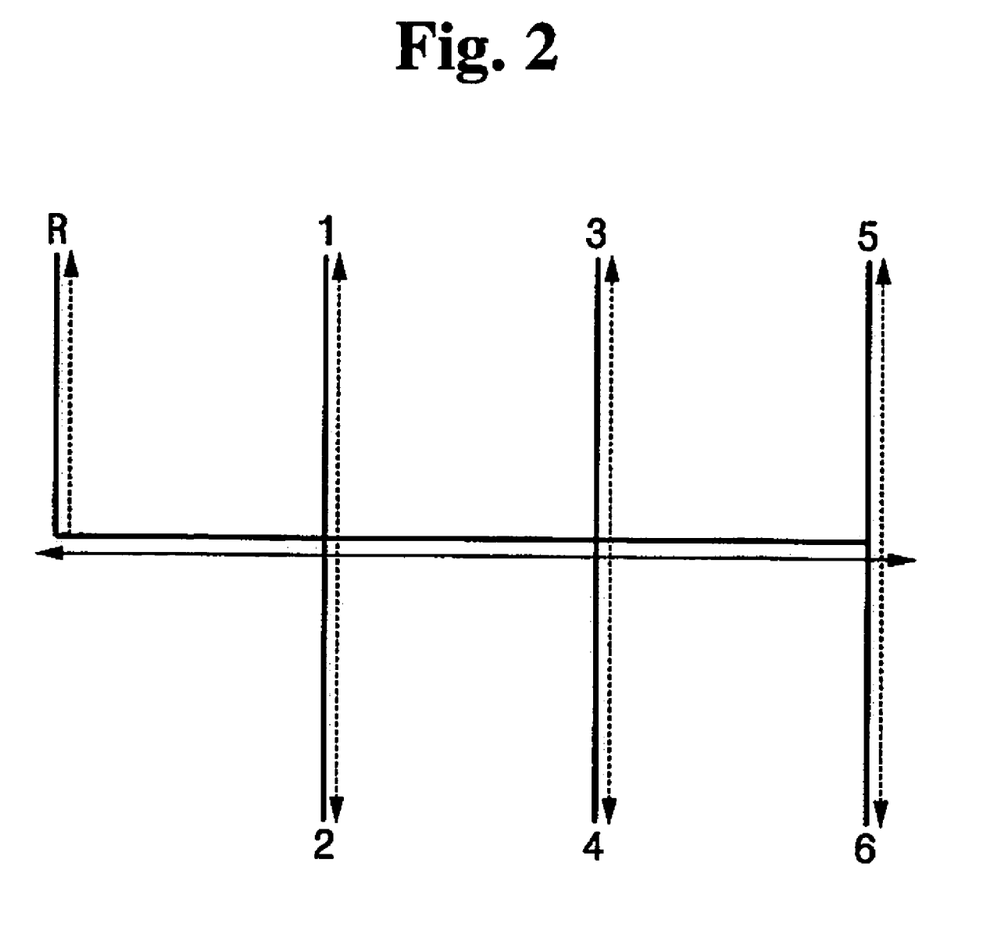
FIG. 2 shows a select motion and a shift motion of a gear shift lever.

As shown in FIG. 2, when the gear shift lever 103 moves in a first direction shown by a solid line, a select operation is performed, and when the gear shift lever 103 moves in a second direction shown by dotted lines, a shift operation is performed. Hereinafter, motion of the gear shift lever 103 in the first direction is referred to as a select motion, and motion of the gear shift lever 103 in the second direction is referred to a shift motion.

The shift control apparatus 100 according to the preferred embodiment of the present invention includes a select control assembly 105 and a shift control assembly 107. The select control assembly 105 operates responding to the select motion of the gear shift lever 103, and the shift control assembly 107 operates responding to the shift motion of the gear shift lever 103.

The select control assembly 105 and the shift control assembly 107 are mounted on a control housing 109. The control housing 109 is coupled to a transmission housing 102 through a bolt 110, and a control shaft 111 is horizontally disposed within the control housing 109.

Figure 3:
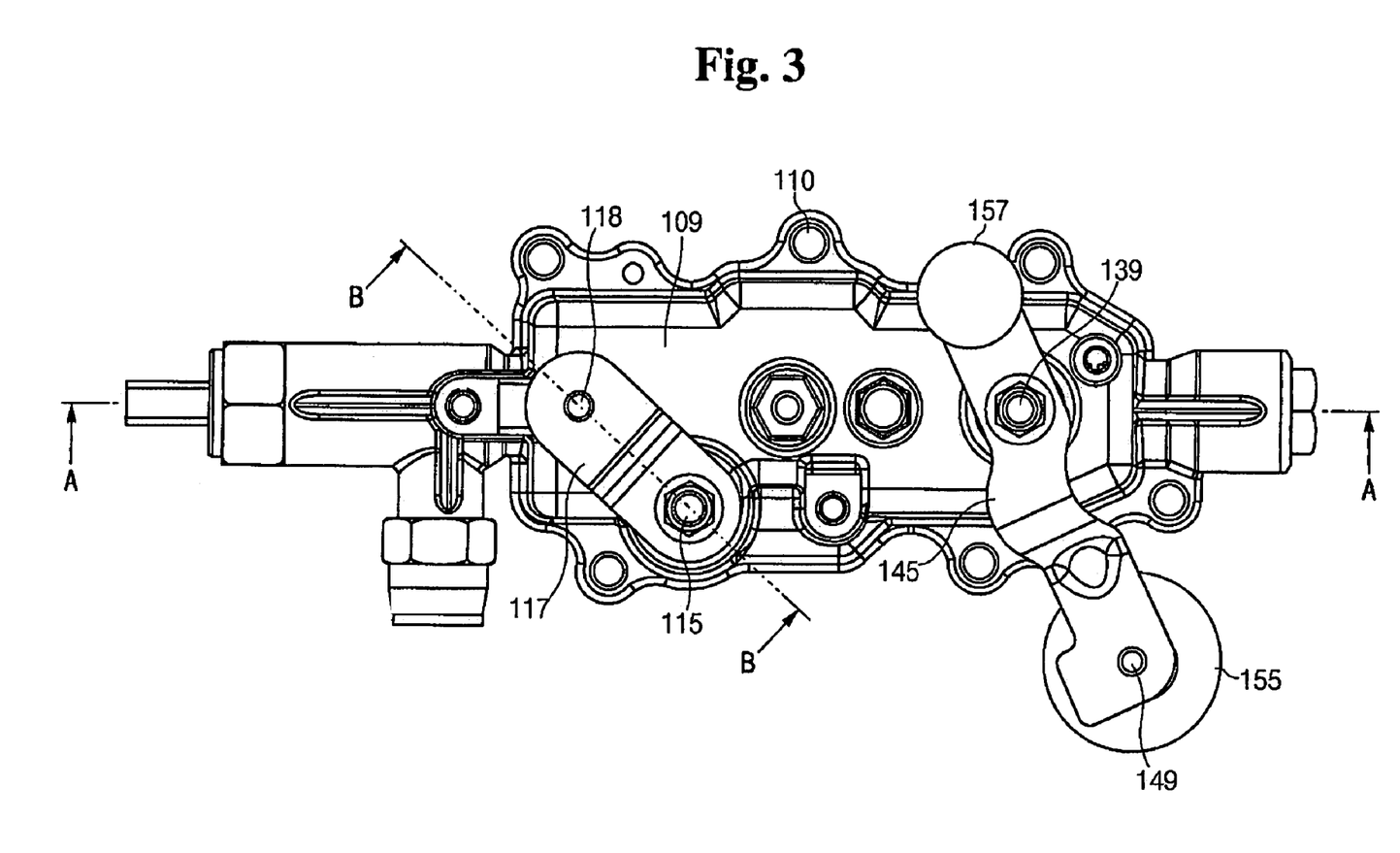
FIG. 3 is a top view of the shift control apparatus of FIG. 1.
Figure 4:
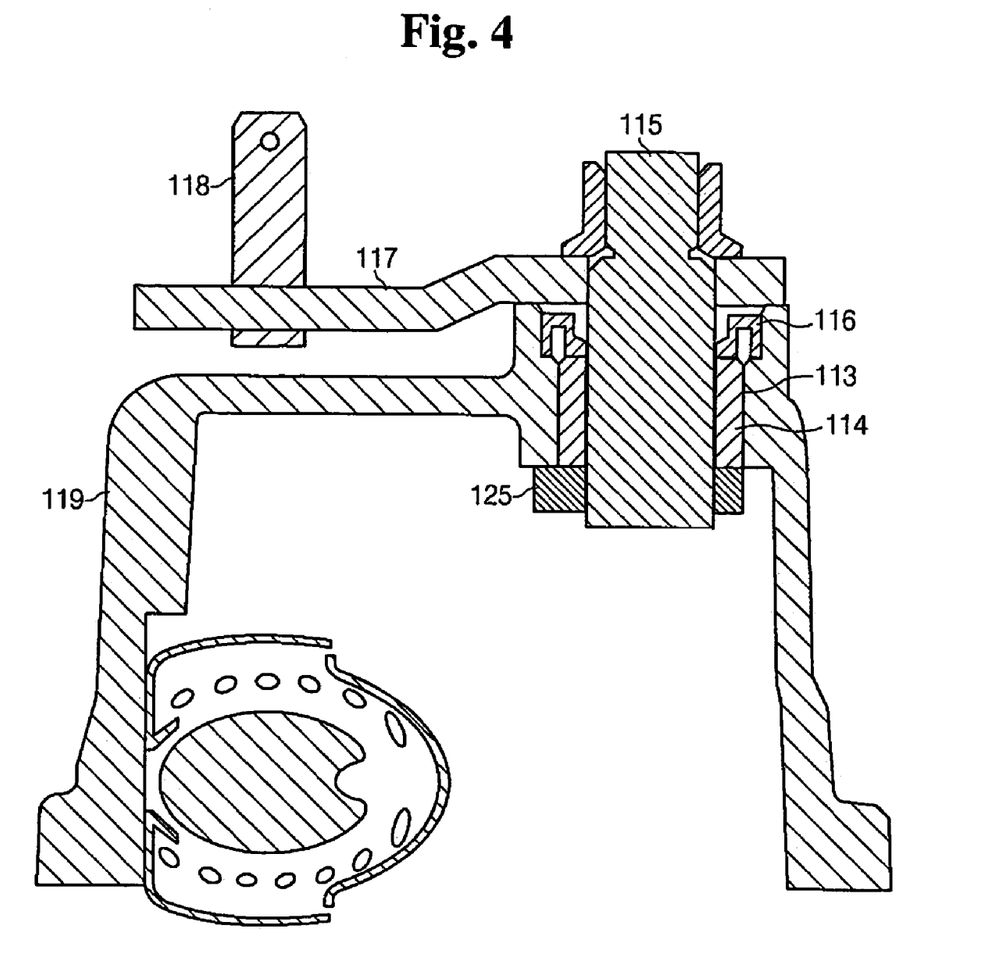
FIG. 4 is a sectional view along line B-B of FIG. 3.

Referring to FIGS. 1, 3, 4, and 6, the select control assembly 105 will be explained. The select control assembly, as shown in FIG. 4, includes a select control shaft 115 that is rotatably inserted into a first through hole 113 that is formed in the control housing 109. Preferably, a needle bearing 114 and an oil seal 116 are disposed around the select control shaft 115.

Figure 6:
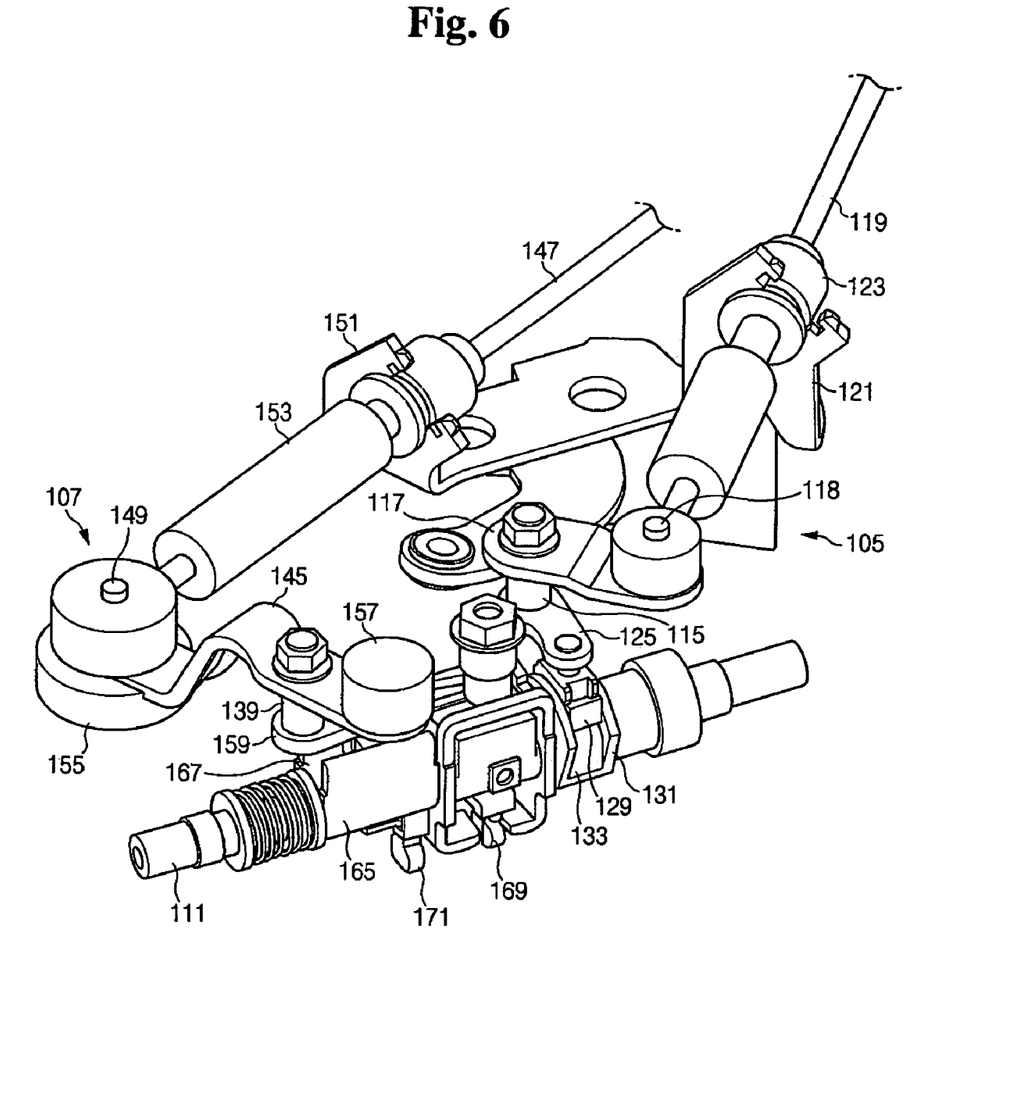
FIG. 6 is a perspective view of the shift control apparatus according to an embodiment of the present invention.

As show in FIGS. 3 and 6, the select control shaft 115 is disposed above the control shaft 111, and it is away from a longitudinal center axis of the control shaft 111. As show in FIG. 4, an upper portion of the select control shaft 115 is positioned at an outside of the control housing 109, and a lower portion thereof is positioned within the control housing 109. One end of a select control lever 117 is fixedly connected to the upper portion of the select control shaft 115.

One end of a select control cable 119 is pivotally connected to the other end of the select control cable 119 through a pivot pin 118. The other end of the select control cable 119 is connected to the gear shift lever 103 such that the select control cable 119 undergoes a push-pull operation responding to the select motion of the gear shift lever 103. The select control cable 119 can be connected to the gear shift lever 103 in a conventional way. Preferably, the select control cable 119 is slidably inserted into a protection guide 123 that is fixedly coupled to a mounting bracket 121 that is mounted on the transmission housing 102.

Figure 8:
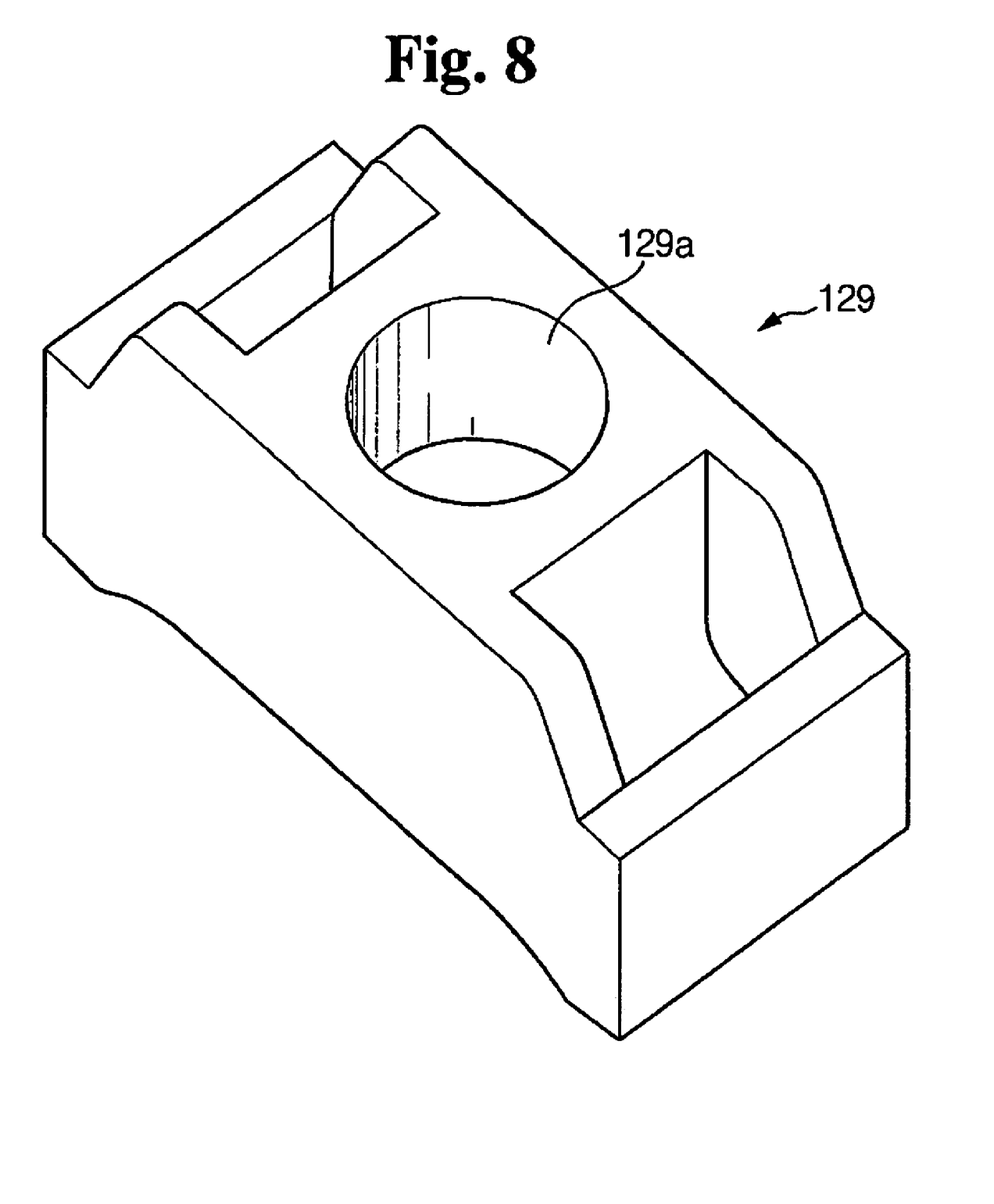
FIG. 8 shows a select shoe of the shift control apparatus according to an embodiment of the present invention.

A connecting plate 125 is coupled to a lower portion of the select control shaft 115. A downwardly extending pin 127 is coupled to the connecting plate 125, and a lower portion of the pin 127 is inserted into a select shoe 129. As shown in FIG. 8, a pin-receiving hole 129a is formed in a center of the select shoe 129, and the pin 127 is rotatably inserted into the pin receiving hole 129a.

The select shoe 129 can be made of a plastic material, and it is disposed in a select shoe guide channel 133 of a select shoe guide 131 that is fixedly coupled to the control shaft 111. The select shoe guide 131 is fixedly coupled to the control shaft 111 through a coupling bolt 135. The select shoe guide channel 133 is formed in a circumferential direction of the control shaft 111, and the select shoe 129 is slidably disposed within the select shoe guide channel 133.

Therefore, the select shoe 129 can move along a circumferential direction of the control shaft 111.

If the select control cable 119 is operated by the select motion of the gear shift lever 103, the select control shaft 115 rotates, so that the connecting plate 125 rotates with respect to the select control shaft 115. If the connecting plate 125 rotates with respect to the select control shaft 115, the select shoe 129 pushes the select shoe guide 131 in a longitudinal direction of the control shaft 111 while the select shoe 129 moves within the select shoe guide channel 133, so that the control shaft 111 moves in a longitudinal direction thereof. Consequently, the control shaft 111 moves in the longitudinal direction thereof responding to the select motion of the gear shift lever 103.

Referring to FIGS. 1, 3, 5, and 6, the shift control assembly 107 will be explained. The shift control assembly 107, as show in FIG. 5, includes a shift control shaft 139 that is rotatably inserted into a second through hole 137 that is formed in the control housing 109. Preferably, a needle bearing 141 and an oil seal 143 are disposed around the shift control shaft 139. The shift control shaft 139 is disposed above the control shaft 111.

Figure 5:
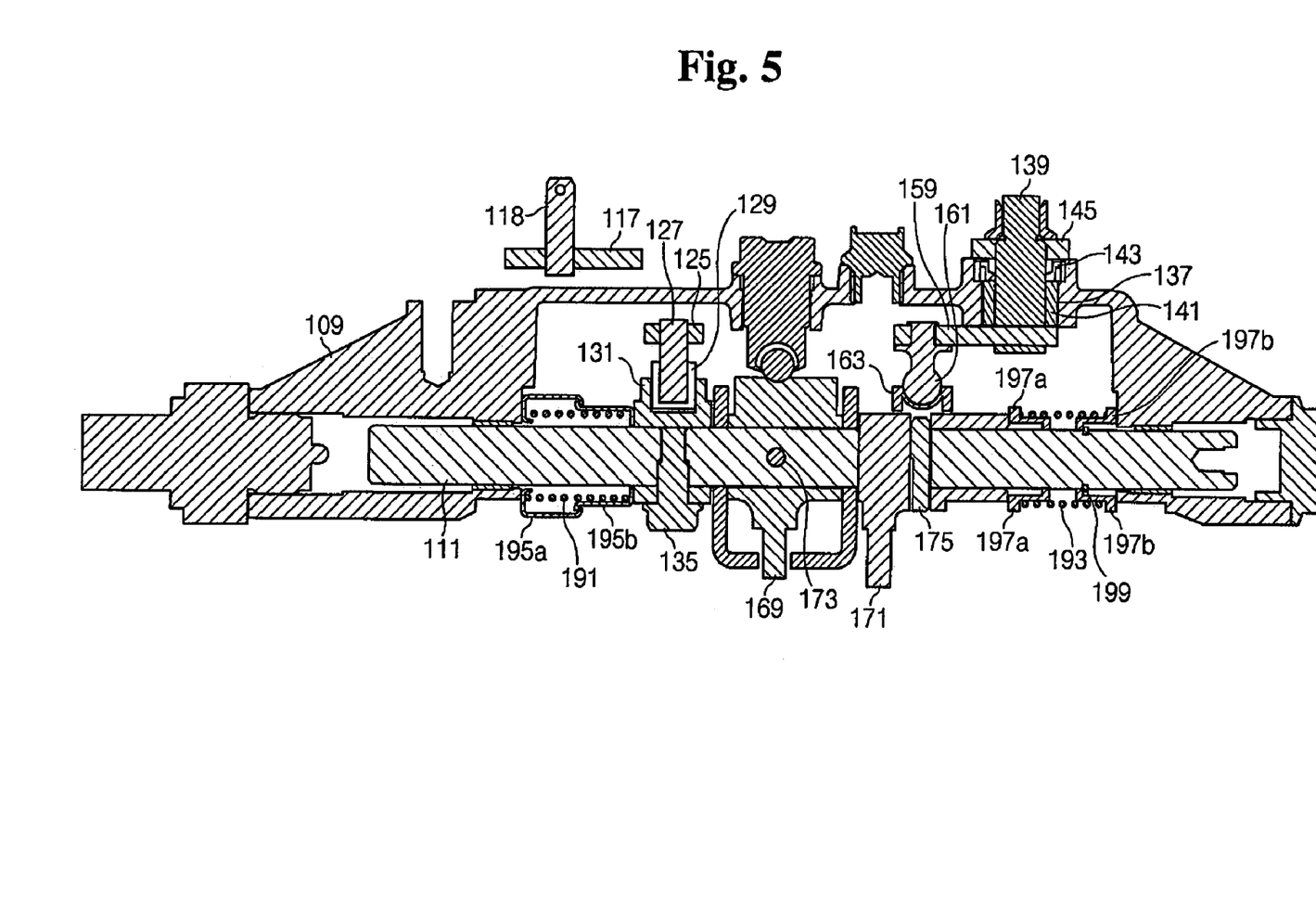
FIG. 5 is a sectional view along line A-A of FIG. 3.

As shown in FIG. 5, an upper portion of the shift control shaft 139 is disposed outside of the control housing 109, and a lower portion of the shift control shaft 139 is disposed within the control housing 109. One end of a shift control lever 145 is fixedly coupled to an upper end of the shift control shaft 139, and one end of a shift control cable 147 is pivotally connected to the other end of the shift control lever 139 through a pivot pin 149. The other end of the shift control cable 147 is connected to the gear shift lever 103 such that the shift control cable undergoes push-pull movements responding to the gear shift lever 103. The shift control cable 147 can be connected to the gear shift lever 103 in a conventional way. Preferably, the shift control cable 147 is slidably inserted into a protection guide 153 that is coupled to a mounting bracket 151 that is mounted on the transmission housing 102.

As shown in FIGS. 1 and 6, a first mass 155 and a second mass 157 are respectively coupled to ends of the shift control lever 145. The first mass 155 is coupled to the end of the shift control lever 145 where the shift control cable 147 is connected, and the second mass 157 is coupled to the other end of the shift control lever 145. The shift control shaft 139 is fixedly coupled to the shift control lever 145 at a position between the ends thereof.

The first mass 155 provides a damping force during the shift motion of the gear shift lever 103, and the second mass 157 is positioned such that a rotating center position of the shift control lever 145 is positioned at or near the shift control shaft 139. One end of a connecting plate 159 is fixedly connected to the lower portion of the shift control shaft 139. A ball 161 is coupled to the other end of the connecting plate 159, and the ball 161 is positioned below the connecting plate 159. The ball 161 is rotatably connected to a shift shoe 163, which can be made of a plastic material.

Figure 9:
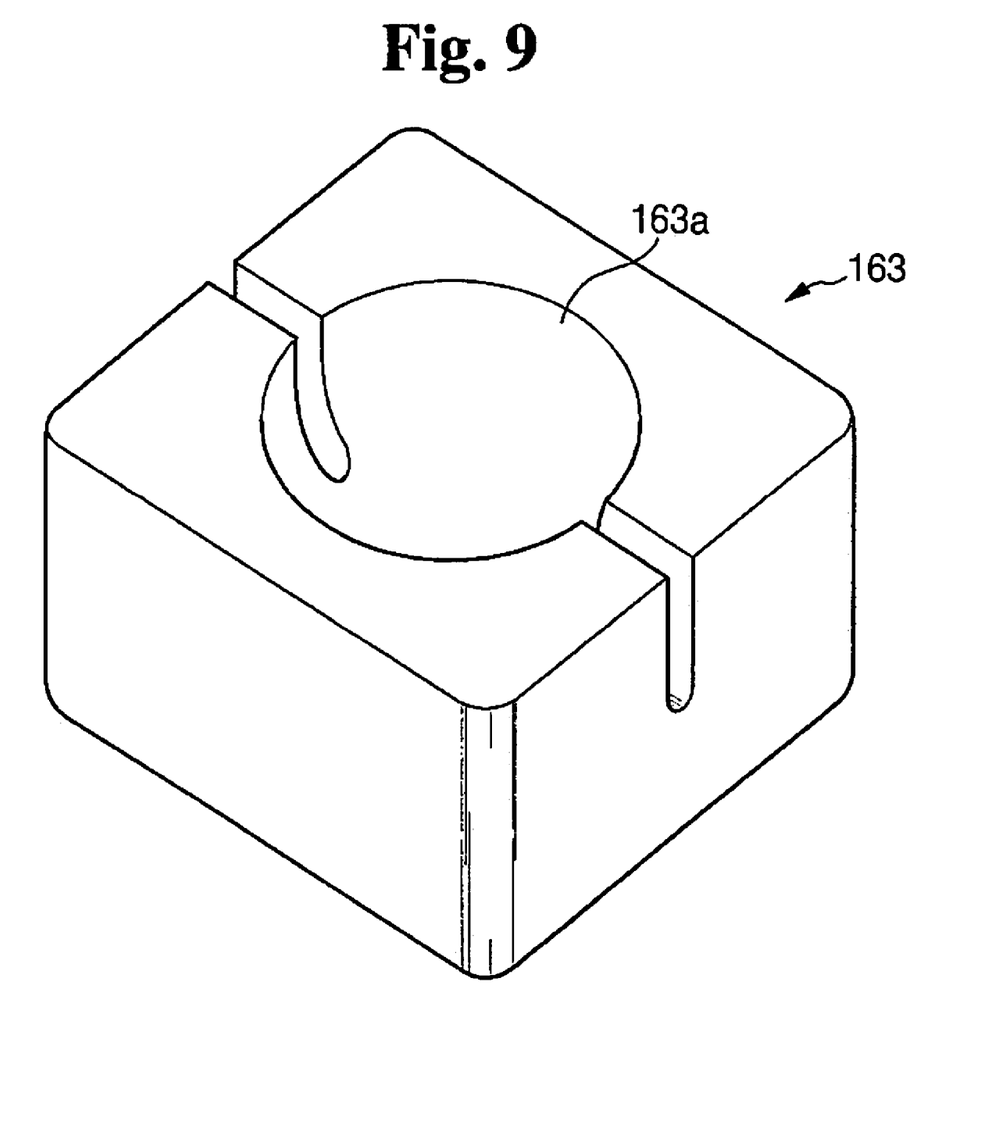
FIG. 9 shows a shift shoe of the shift control apparatus according to an embodiment of the present invention.

As shown in FIG. 9, a ball-receiving hole 163a is formed at a center portion of the shift shoe 163, and the ball 161 is rotatably disposed within the ball receiving hole 163a. As shown in FIG. 5, the shift shoe 163 is disposed within a shift shoe guide channel 167 of a shift shoe guide 165 that is fixedly coupled to the control shaft 111. The shift shoe guide channel 167 is formed along a longitudinal direction of the control shaft 111, and the shift shoe 163 is slidably disposed within the shift shoe guide channel 167 such that it can move in a longitudinal direction of the control shaft 111.

If the shift control cable 147 is operated by the shift motion of the gear shift lever 103, the shift control shaft 139 rotates, so that the connecting plate 159 rotates with respect to the shift control shaft 139. If the connecting plate 159 rotates with respect to the shift control shaft 139, the shift shoe 163 pushes the select shoe guide 131 in a circumferential direction of the control shaft 111 while the shift shoe 163 moves within the shift shoe guide channel 167, so that the control shaft 111 rotates. Consequently, the control shaft 111 rotates responding to the shift motion of the gear shift lever 103.

A forward speed ratio finger 169 and a reverse speed ratio finger 171 are coupled to the control shaft 111. The forward and reverse speed ratio fingers 169 and 171 are extended in a lower direction of the control shaft 111. The forward speed ratio finger 169 is fixedly coupled to the control shaft 111 through a locking pin 173, and the reverse speed ratio finger 171 is integrated with the shift shoe guide 165. The shift shoe guide 165 and the reverse speed ratio finger 171 are fixedly coupled to the control shaft 111 through a locking pin 175. Therefore, the forward and reverse speed ratio fingers 169 and 171 move together with the control shaft 111.

Figure 7:
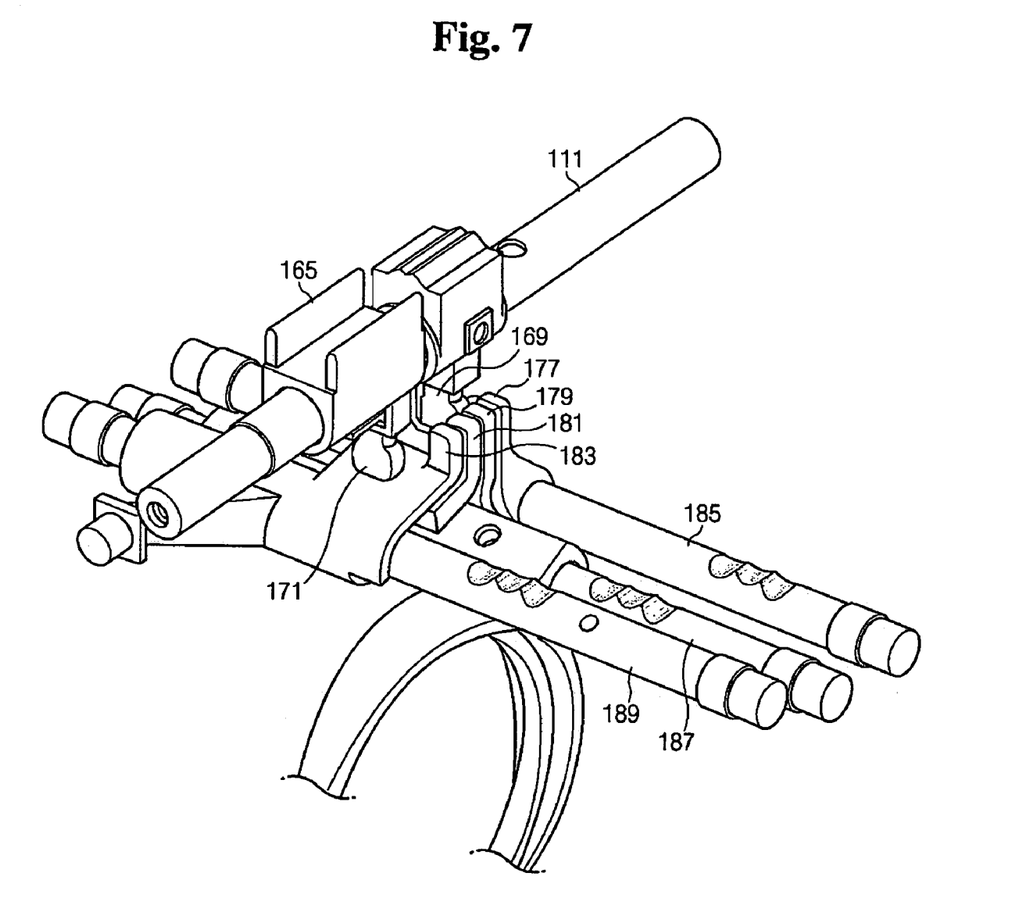
FIG. 7 shows a control shaft and shift lugs of the shift control apparatus according to an embodiment of the present invention.

As shown in FIG. 7, the forward speed ratio finger 169 is coupled to the control shaft 111 such that the forward speed ratio finger 169 can be positioned within one of a first/second speed ratio shift lug 177, a third/fourth speed ratio shift lug 179, and a fifth/sixth speed ratio shift lug 181.

The reverse speed ratio finger 171 is coupled to the control shaft 111 such that the reverse speed ratio finger 171 is positioned within a reverse speed ratio shift lug 183 when the forward speed ratio finger 169 is positioned outside of the first/second speed ratio shift lug 177.

The first/second speed ratio shift lug 177 is connected to a first/second speed ratio shift rail 185, the third/fourth speed ratio lug 179 is connected to a third/fourth speed ratio lug 187, and the fifth/sixth speed ratio lug 181 is connected to a fifth/sixth speed ratio shift rail 189.

The first/second, third/fourth, and fifth/sixth speed ratio shift rails 185, 187, 189 are components of the transmission 101. A first or second speed ratio can be established by longitudinal movements of the first/second speed ratio shift rail 185, a third or fourth speed ratio can be established by longitudinal movements of the third/fourth speed ratio shift rail 187, and a fifth or sixth speed ratio can be established by longitudinal movements of the fifth/sixth speed ratio speed rail 189.

The reverse speed ratio shift lug 183 can be a component for establishing a reverse speed ratio according to its operation. It is also possible that the reverse speed ratio shift lug 183 is connected to a separate reverse speed ratio shift rail.

If the control shaft 111 moves along its longitudinal direction responding to the select motion of the gear shift lever 103, the forward speed ratio finger 169 can be positioned within one of the first/second speed ratio shift lug 177, the third/fourth speed ratio shift lug 179, the fifth/sixth speed ratio shift lug 181, and the outside of the first/second speed ratio shift lug 177. When the forward speed ratio finger 169 is positioned at the outside of the first/second speed ratio shift lug 177, the reverse speed ratio finger 171 is positioned within the reverse speed ratio shift lug 183. At this time, if the control shaft 111 rotates responding to the shift motion of the gear shift lever 103, the forward speed ratio finger 169 or the reverse speed ratio finger 171 rotates one of the shift lugs 177, 179, 181, and 183 within which the forward speed ratio finger 169 or the reverse speed ratio finger 171 are positioned.

As shown in FIG. 5, the shift control apparatus 100 according to the preferred embodiment of the present invention includes a first elastic member 191 and a second elastic member 193 that elastically support the control shaft 111 in opposite directions with respect to the control housing 109. The first and second elastic members 191 and 193 can be coil springs, and they respectively elastically support the control shaft 111 in rightward and leftward directions in the drawing such that the control shaft 111 is disposed at a predetermined neutral position when the control shaft 111 is not actuated by the select control assembly 105 and the shift control assembly 107. Preferably, when the control shaft 111 is positioned in the predetermined neutral position, the forward speed ratio finger 169 is positioned within the third/fourth speed ratio shift lug 187.

The first elastic member 191 is positioned within a space that is defined by a first elastic member housing 195a and a second elastic member housing 195b that can relatively move. One end of the first elastic member 191 is supported by the control housing 109, and the other end of the first elastic member 191 is supported by the select shoe guide 131.

The second elastic member 193 is disposed between a first elastic member seat 197a and a second elastic member seat 197b. The first elastic member seat 197a is supported by the shift shoe guide 165 that is coupled to the control shaft 111, and the second elastic member seat 197b is supported by the control housing 109. The second elastic member seat 197b is supported by a snap ring 199 that is coupled to the control shaft 111.

The present invention described above provides a shift control apparatus for a six-speed transmission. However, the present invention can also be applied to any transmission such as a four-speed or five-speed transmission by changing a number of shift speed that can be selected by the gear shift lever and a number of shift lugs, as will be appreciated by one of ordinary skill in the art.

According to the embodiment of the present invention, the select control assembly and the shift control assembly act independently, so that gear shift feeling is improved. Furthermore, because the shift shoe and the select shoe are provided, shocks of the transmission can be prevented from being transmitted to the gear shift lever. According to the embodiment of the present invention, the control shaft is elastically supported in opposite directions by two coil springs, so select feeling is substantially improved. Furthermore, because the rotating center of the shift lever is positioned by the first and second mass, a shift feeling is improved by an inertia force.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control apparatus for a transmission comprising:
    a gear shift lever configured to undergo movement in a first direction and in a second direction;
    a plurality of shift lugs disposed within a transmission and configured to realize specific speed ratios according to its longitudinal movement;
    a housing comprising a first and a second through hole;
    a control shaft disposed within the housing and provided with at least one control finger at a lower portion thereof, the control shaft configured to be able to move in a longitudinal direction thereof such that the control finger can be positioned on the shift lugs, and the control shaft configured to be able to rotate such that the control shaft can move the shift lugs;
    a select control assembly connected to the gear shift lever and the control shaft such that the control shaft moves in the longitudinal direction thereof responding to a movement of the gear shift lever in the first direction; and
    a shift control assembly connected the gear shift lever and the control shaft such that the control shaft rotates responding to a movement of the gear shift lever in the second direction;
    wherein the select control assembly comprises:
        a select control shaft rotatably inserted into the first through hole;
        a select control lever fixedly connected to an upper portion of the select control shaft;
        a select control cable connecting the gear shift lever and the select control lever together such that the select control lever and the select control shaft rotate responding to the movement of the gear shift lever in the first direction;
        a connecting plate, one end of which is fixedly connected to a lower portion of the select control shaft;
        a pin member, an upper portion of which is fixedly connected to the other end of the connecting plate at a lower portion thereof;
        a select shoe into which a lower portion of the pin member is rotatably inserted; and
        a select shoe guide fixedly coupled to the control shaft and being provided with a select shoe guide channel within which the select shoe is slidably disposed;
    and wherein the shift control assembly comprises:
        a shift control shaft rotatably inserted into the second through hole;
        a shift control lever fixedly connected to an upper portion of the shift control shaft;
        a shift control cable connecting the gear shift lever and the shift control lever together such that the shift control lever and the shift control shaft rotate responding to the movement of the gear shift lever in the second direction;
        a connecting plate, one end of which is fixedly connected to a lower portion of the shift control shaft;
        a ball member, an upper portion of which is fixedly connected to the other end of the connecting plate at a lower portion thereof;
        a shift shoe into which a lower portion of the ball member is rotatably inserted; and
        a shift shoe guide fixedly coupled to the control shaft and being provided with a shift shoe guide channel within which the shift shoe is slidably disposed.

2. The shift control apparatus of claim 1, wherein the select shoe is made of a plastic material.

3. The shift control apparatus of claim 1, wherein the select shoe guide channel is formed along a circumferential direction of the control shaft.

4. The shift control apparatus of claim 1, wherein the select control shaft is disposed above the control shaft and away by a predetermined distance from a longitudinal center axis of the control shaft.

5. The shift control apparatus of claim 1, wherein the shift shoe is made of a plastic material.

6. The shift control apparatus of claim 1, wherein the shift shoe guide channel is formed along a longitudinal direction of the control shaft.

7. The shift control apparatus of claim 1, wherein the shift control shaft is disposed above the control shaft.

8. The shift control apparatus of claim 1, wherein the control shaft is provided with a forward speed ratio finger and a reverse speed ratio finger, and the reverse speed ratio finger is integrated with the shift shoe guide.

9. The shift control apparatus of claim 1, wherein the shift control assembly further comprises a first mass and a second mass that are respectively coupled to ends of the shift control lever.

10. The shift control apparatus of claim 9, wherein the shift control cable is pivotally connected to the shift control lever near a position where the first mass is coupled to the shift control lever, and wherein the shift control shaft is coupled to the shift control lever at a position between a position where the first mass is coupled to the shift control lever and a position where the second mass is coupled to the shift control lever.

11. The shift control apparatus of claim 10, wherein the second mass is configured such that a rotating center of the shift control lever is positioned at a position where the shift control shaft is coupled to the shift control lever.

12. The shift control apparatus of claim 1, further comprising a first elastic member and a second elastic member that elastically support the control shaft in opposite directions.

13. The shift control apparatus of claim 12, wherein the first and second elastic members are coil springs.

14. The shift control apparatus of claim 1, wherein the plurality of shift lugs comprises at least one forward speed ratio shift lug, and wherein the control shaft is provided with a forward speed ratio finger for moving the forward speed ratio shift lugs and a reverse speed ratio finger for moving the reverse speed ratio shift lug.

* * * * *